United States Patent [19]

Roth

[11] Patent Number: 5,217,783
[45] Date of Patent: Jun. 8, 1993

[54] TWO-SIDED CARPET CONSTRUCTION AND METHOD OF MANUFACTURE THEREOF

[75] Inventor: David W. Roth, Grosse Pointe Park, Mich.

[73] Assignee: The 2500 Corporation, Farmington Hills, Mich.

[21] Appl. No.: 549,833

[22] Filed: Jul. 9, 1990

Related U.S. Application Data

[63] Continuation of Ser. No. 462,332, Dec. 28, 1989, abandoned, which is a continuation of Ser. No. 225,067, Jul. 27, 1988, abandoned, which is a continuation of Ser. No. 149,385, Jan. 28, 1988, abandoned, which is a continuation of Ser. No. 38,585, Apr. 15, 1987, abandoned, which is a continuation of Ser. No. 992,286, Oct. 23, 1986, abandoned, which is a continuation-in-part of Ser. No. 723,475, Apr. 15, 1985, abandoned, which is a continuation of Ser. No. 587,802, Mar. 9, 1984, Pat. No. 4,563,378.

[51] Int. Cl.$^5$ .................... B32B 3/02; B32B 33/00
[52] U.S. Cl. .................... 428/92; 428/85; 428/96; 428/95
[58] Field of Search .............. 156/72, 324; 428/93, 428/85, 95, 96, 97, 92

[56] References Cited

U.S. PATENT DOCUMENTS

| | | | |
|---|---|---|---|
| 1,872,581 | 8/1932 | Haroldson | 428/87 |
| 2,073,894 | 3/1937 | Wood | 428/95 X |
| 3,176,643 | 4/1965 | Spencer | 428/91 |
| 3,215,584 | 11/1965 | McConnell et al. | 428/95 X |
| 3,219,507 | 11/1965 | Penman | 428/95 X |
| 3,528,874 | 9/1970 | Spencer | 428/89 |
| 3,533,893 | 10/1970 | Hartstein | 428/95 |
| 3,687,796 | 8/1972 | Stumpf et al. | 428/95 |
| 3,919,444 | 11/1975 | Shayman | 428/95 |
| 4,044,183 | 8/1977 | Forrest | 428/95 |
| 4,169,176 | 9/1979 | Hartmann et al. | 428/95 |
| 4,415,618 | 11/1983 | McClung, Jr. | 428/95 X |
| 4,576,848 | 3/1986 | Dillon et al. | 428/95 X |
| 4,649,069 | 3/1987 | Tone | 428/95 X |
| 4,766,022 | 8/1988 | Tone | 428/85 |
| 4,984,606 | 1/1991 | Moore et al. | 428/85 X |

Primary Examiner—George F. Lesmes
Assistant Examiner—Terrel Morris
Attorney, Agent, or Firm—Marshall & Melhorn

[57] ABSTRACT

The specification discloses a two-sided carpet construction and a method for the continuous manufacture thereof. The carpet manufacturing process begins by tufting a carpet yarn into a scrim layer. The process continues up to the point where the bonding material is applied to the carpet scrim to lock the tufts of the carpet fiber in place. In the process disclosed herein, immediately after the bonding material is applied, a piece of carpet material, by which may be similar to the piece just described, or which may be different in color or construction from that just described, is continuously applied in 180° opposed relationship on the top of the bonding material just applied. The carpet construction thus formed is then passed through pressure applying means to firmly force the bonding material into the carpet tufts and carpet scrim to form a continuous piece of two-sided carpet material having approximately half the weight of bonding materials of previous constructions.

10 Claims, 3 Drawing Sheets

TWO-SIDED CARPET CONSTRUCTION AND METHOD OF MANUFACTURE THEREOF

CROSS REFERENCES TO RELATED APPLICATIONS

This is a continuation of copending application Ser. No. 07/462,332 filed on Dec. 28, 1989 which is a continuation of application Ser. No. 07/225,067 filed Jul. 27, 1988, which is a continuation of application Ser. No. 07/149,385 filed on Jan. 28, 1988, which is a continuation of application Ser. No. 07/038,585 filed on Apr. 15, 1987, which is a continuation of application Ser. No. 06/922,286 filed Oct. 23, 1986, which is a continuation-in-part of application Ser. No. 06/723,475 filed on Apr. 15, 1985, which is a continuation-in-part of application Ser. No. 06/587,802, filed Mar. 9, 1984, now U.S. Pat. No. 4,563,378. All applications are now abandoned except where indicated.

The benefit of the filing dates of the earlier continuation-in-part applications is hereby specifically claimed.

FIELD OF THE INVENTION

The present invention relates to carpeting, and more particularly to an improved carpet construction having the carpet nap on the top and bottom of the carpet, as well as to a method for making the same.

DESCRIPTION OF THE PRIOR ART

Two-sided carpet is becoming widely used in a variety of applications. One such use of which Applicant is aware is to make automotive floor mats which are placed immediately in front of the front and rear seats of an automobile to protect the automotive carpet from excessive wear from occupants continually entering and exiting the automotive vehicle. While some of these floor mats have carpeting on only one side, and have rubber backing forming the other side of the floor mat, many of said floor mats have carpeting on the top and bottom of the floor mat to make them reversible, so as to extend their life.

Until the present invention, these floor mats were commonly made by taking two pieces of carpet made in the conventional manner, die cutting them to the desired shape of the mat, applying adhesive to the backing of the carpet, and applying an edge binding thereto to hold the two pieces together.

Since the making of a piece of carpet in the conventional manner means, at minimum, the tufting of a carpet yarn into a scrim by a needled motion, severing all or some of the loops so formed, if desired, and then applying a bonding layer, the taking of two pieces of carpet made in the conventional manner, applying adhesive to one of the pieces of carpet, and placing them back to back, involves producing a carpet having seven layers, i.e., upper loops, upper scrim, upper bonding layer, adhesive layer, lower bonding layer, lower scrim and lower loops.

However, this construction makes for a very heavy expensive construction because at least one layer of bonding material and the adhesive material on the two pieces of carpet being sewn together is unneeded, and the extra weight it provides to the construction is undesirable in the light of the present day desire to reduce the weight of automobiles for increased fuel economy. Thus, the reduction of weight, and manufacturing expense, have remained serious problems in the art of providing automotive floor mats. Also, the prior art conventional method, by requiring that two pieces of carpeting made in the conventional manner be die cut, and have adhesive applied, before they were placed back to back and had edge binding applied, did not, and could not, provide for a continuous process whereby the top surface was of a different color and/or construction than the bottom surface, or vice versa.

SUMMARY OF THE INVENTION

The present invention provides for the continuous manufacture of a two-sided carpet by first manufacturing a carpet by conventional means up to the point where the bonding material is applied. Immediately after the bonding material is applied, a piece of carpet material, which may be similar to the piece just described, or which may be different in color or construction from that just described, is applied in a 180° opposed relationship on top of the bonding material just applied. The carpet is then passed through pressure applying means to firmly force the bonding material into the carpet tufts and carpet scrim to form a continuous piece of two-sided carpet having approximately half the weight of bonding material of previous constructions. The carpet then can be die cut and have edge bindings applied, be molded to various configurations, or have various attachments applied in a conventional manner.

Thus, it is an object of the present invention to provide an improved two-sided carpet construction which is lighter in weight than previous two-sided carpet constructions.

A further object of the present invention is to provide a two-sided automotive floor mat which is lighter in weight than previous constructions.

A further object of the present invention is to provide a two-sided carpet construction using a single application of bonding material to bond the carpet together.

A still further object of the present invention is to provide an improved two-sided carpet construction which is less expensive to manufacture than previous similar constructions.

A still further object of the present invention is to provide a two-sided carpet construction of the foregoing nature which can easily be die cut or molded into various shapes and have various attachments made thereto.

A still further object of the present invention is to provide a two-sided carpet construction wherein the upper carpet material may be identical or different in construction and/or color from the lower carpet material, or vice versa.

Further objects and advantages of the present invention will be apparent from the following description and appended claims, reference being made to the accompanying drawings forming a part of the specification, wherein like reference characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description and not of limitation.

DESCRIPTION OF THE PREFERRED EMBODIMENT

Figure 1:
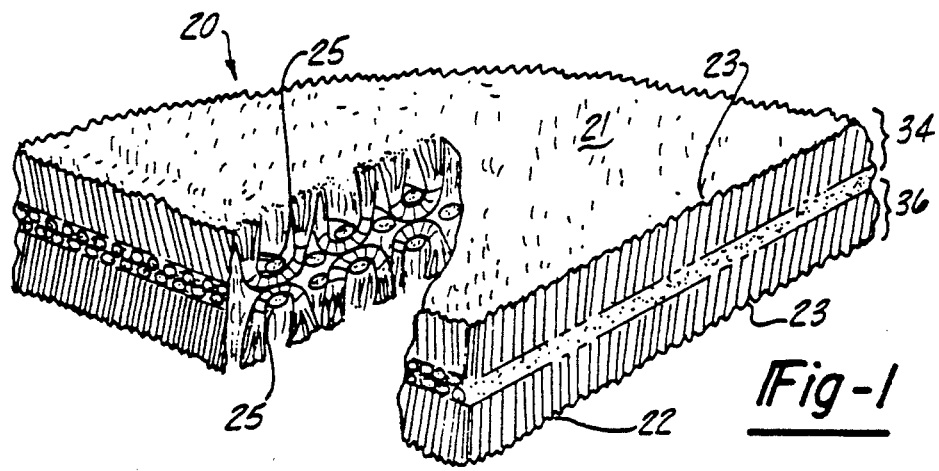
FIG. 1 is a perspective view, partly cut away, of a two-sided carpet embodying the construction of the present invention.

Referring now to FIG. 1, there is shown a perspective view, partially cut away, of a two sided carpet embodying the construction of the present invention. The two-sided carpet, generally designated by the numeral 20, includes an upper carpet material 34 having an upper carpet surface 21, and a lower carpet material 36 having a lower carpet surface 22. Each of the carpeted surfaces, whether it be upper carpeted surface 21 or lower carpeted surface 22, may include a plurality of upwardly or downwardly extending vertical loops 23 having severed ends 24 which have been inserted into a carpet scrim material, generally designated by the numeral 25.

Figure 2:
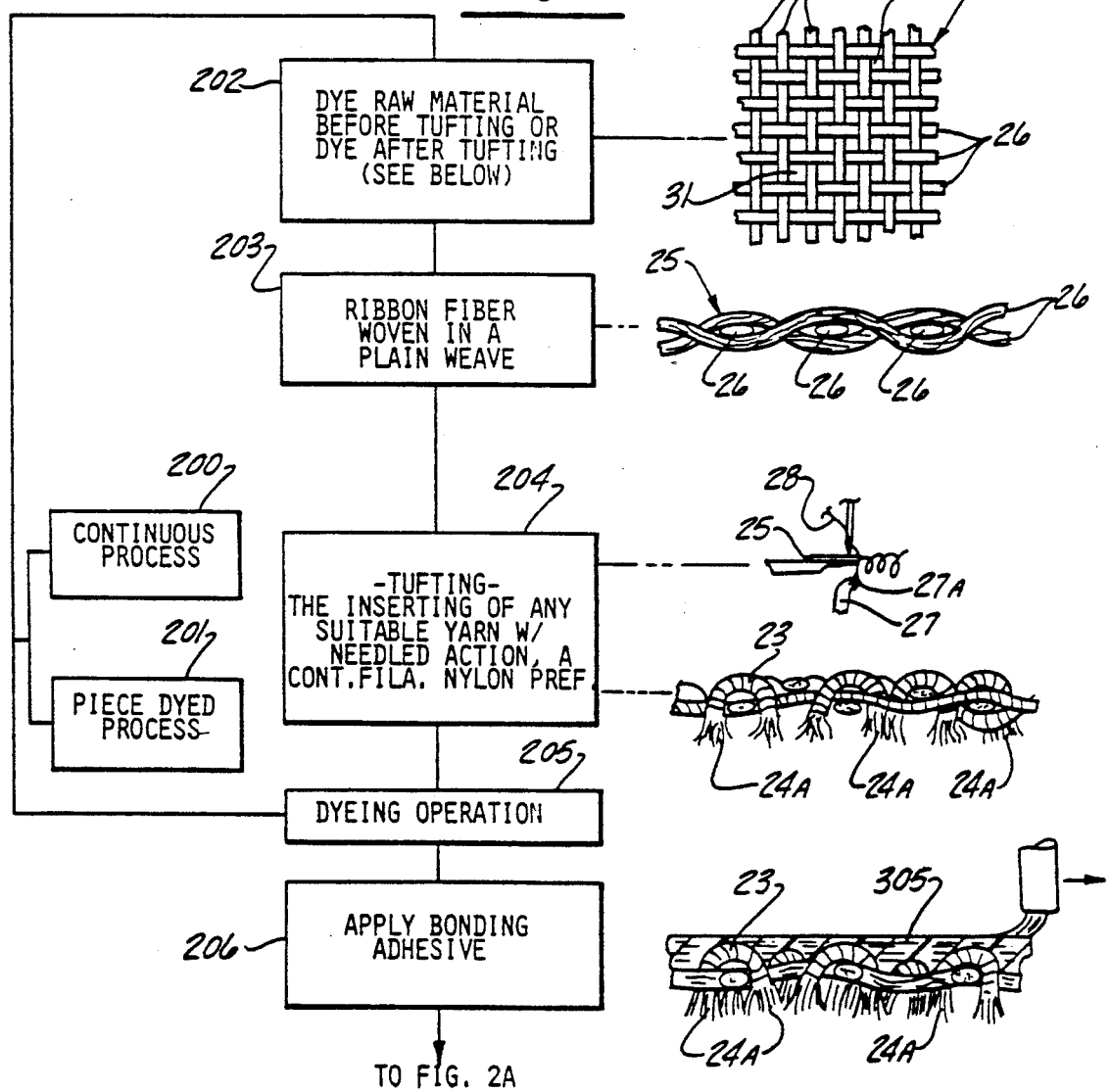
FIG. 2 is a diagrammatic view showing a series of steps used in the manufacture of my improved carpet construction.

When two pieces of scrim 25 containing the vertical loops 23 are joined together, back-to-back, in a continuous process to be described herein after, the two-sided carpet 20, shown in FIG. 1, is produced. To produce the carpet material which will eventually include the upper carpet surface 21 and the lower carpet surface 22, referring more particularly now to FIGS. 2 and 2A, it can be seen that my improved carpet construction basically starts with a scrim 25 which may be formed by strands of ribbon fiber 26 woven together in a plain weave to form the scrim. It should be understood that to make a waterproof construction, the ribbon fiber used in the weave should be of a water impervious construction, and may be dyed to match the fiber to be inserted therein, which will normally be the same color as the interior carpet of the automobile. It should be understood that other fibers may be used in place of the ribbon fiber 26, but the woven ribbon fiber is preferred. The scrim may have a warp of twenty-four strands per inch and a fill of eleven strands per inch, although a wide range of warp and fill are acceptable.

Into the scrim 25 there will be inserted, by tufting, yarn 28 having a preferred density of twelve to twenty ounces per square yard, although a range of from six to fifty ounces per square yard is useable. Since it is preferred that the color of the yarn 28 match the color of the scrim 25, it is contemplated that these may be dyed separately before the tufting operation takes place, or they may be dyed in a continuous dying operation after the tufting takes place. The dying may be either by a continuous process (block 200), or by a piece-dying process (block 201). If this is done before the tufting operation, it is indicated in block 202, and the dyed ribbon fiber is woven in a plain weave (block 203) to form the scrim 25.

The tufting operation (block 204) is nothing more than inserting of any suitable yarn 28 with a needling action. I prefer the tufting to take place at the rate of eight stitches per inch, with a range of five to ten stitches per inch being acceptable for automotive applications. Since it is contemplated that there will be a wide variety of uses for my two-sided carpet construction other than in automotive operations, for other uses of my construction, a range of four to twenty-four stitches per inch can be used. The preferred distance between the rows of tufts, called the carpet gauge, is 5/32 of an inch, with a range of 5/64 to 3/16 of an inch being acceptable. For further information on how the tufting takes place, a good reference work to consult is the Man-Made Fiber and Textile Dictionary published by the Celanese Corporation.

A diagrammatic view of the needling operation appears next to block 204, and involves the yarn 28 being inserted into the scrim 25 by the aid of member 27. Because the member 27 has a knife edge 27A, after the loop is pulled through the scrim, it is cut by knife edge 27A to form a plurality of vertical loops 23 having downwardly extending severed ends 24 filling the interstices 31 in the scrim 25.

As mentioned before, if the scrim 25 and yarn 28 are to be dyed after the tufting operation, this may take place either by the continuous process (block 200), or the piece-dyed process (block 201), as indicated at block 205.

Up until this point, as mentioned before, the manufacture of my two-sided carpet construction has involved basically the same steps as those recited in my co-pending application Ser. No. 06/587,802 now U.S. Pat. No. 4,563,378. However, at this point, the material manufactured thus far is not rotated 180° before having the bonding layer applied. In this case, as in a conventional carpet construction, a bonding material, which may be such as a polyethylene or polypropylene tuftlock, is immediately applied to the construction thus far formed in a continuous hot flow at a rate of approximately three pounds per square foot to provide a bonding layer 30 completely covering the vertical loops 23.

It should be understood that depending upon the application, materials other than polyethylene or polypropylene tuftlock may be used in the present construction. However, for automotive applications where a water impervious material is preferred, the polyethylene or polypropylene tuftlock is the preferred material.

After the bonding layer 30 is applied (block 206), there is a choice to be made in the continuation of the process. It can be seen that the upper carpet material 34 and the lower carpet material 36 are joined together continuously before they go into the pressure rollers 35. In the preferred embodiment, the upper carpet material 34 and the lower carpet material 36 are identical except for their 180° opposed relationship, and they each may come off preformed rolls (not shown), or there may be two production lines performing the steps shown in blocks 200-206, with the upper carpet material 34 simply being rotated 180° before going through the pressure rollers 35. Either method will work just as satisfactorily, and the choice is up to the manufacturer of my improved carpet construction.

While the preferred embodiment the upper carpet material 34 and the lower carpet material 36 are identical, it should be understood that the upper carpet material 34 can be different in color and/or construction than the lower carpet material 36, or vice versa, with the same choices of running two production lines or providing two preformed rolls being available. It is contemplated that, if during the manufacture of the upper carpet material 34 the loops are not severed by the member 27, a loop pile will form the upper carpet material 34, and this then may be applied in a manner similar to that just described to the lower carpet material 36 to form the construction shown in FIG. 3.

As illustrated, the lower carpet material 36 is identical to that just described, in that during manufacture the loops 23 have the ends 24A severed by the knife edge 27A of the member 27. However, in this instance, the upper carpet material 34 is of a loop pile, as none of the loops 23 have been severed during manufacture because the knife edge 27A was not provided on the member 27.

Figure 3:
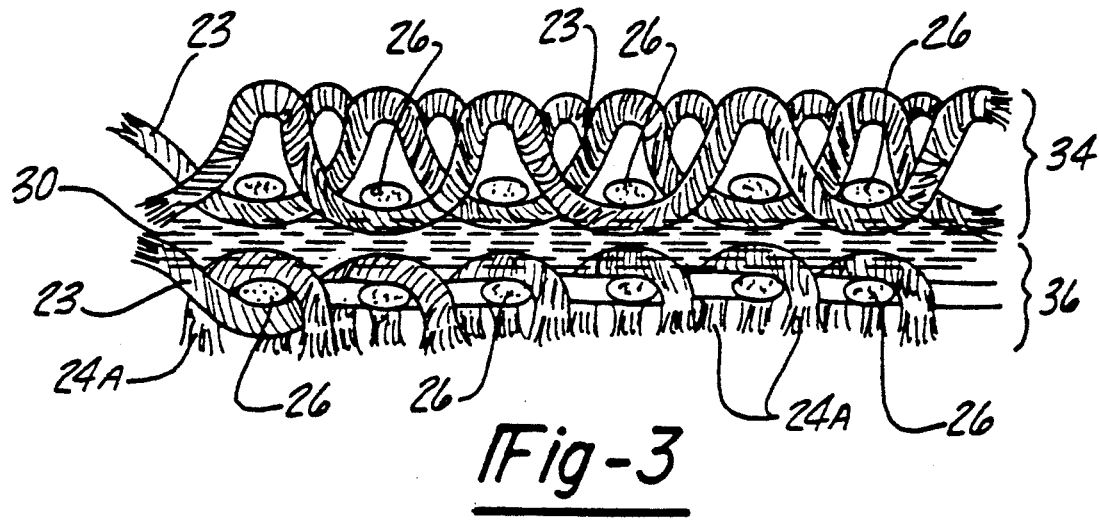
FIG. 3 is an elevational view, partly in section, showing a modification of my construction wherein the upper carpet material is of a loop construction, and the lower carpet material is of a cut construction.
Figure 4:
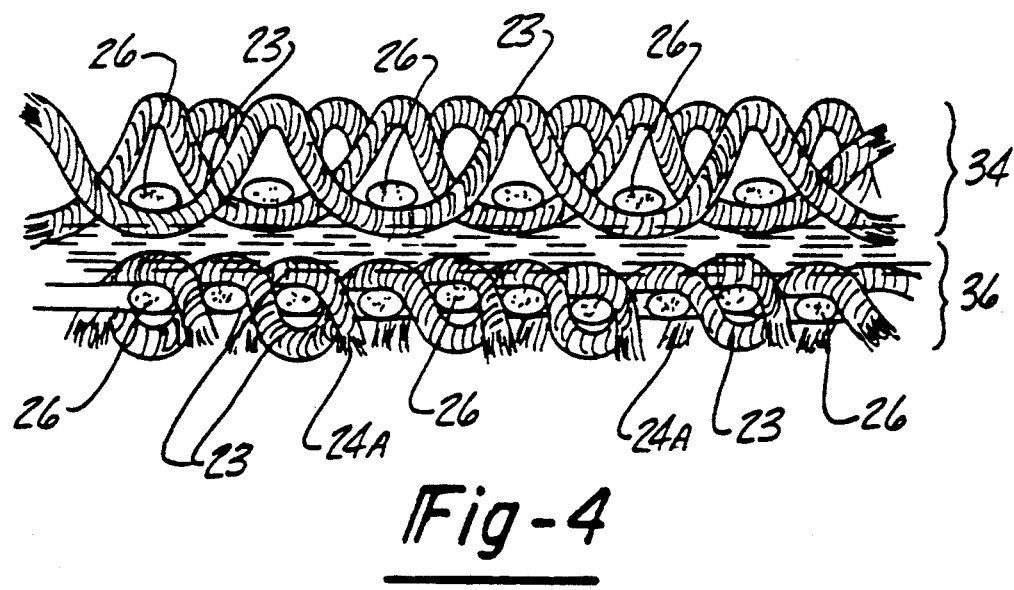
FIG. 4 is an elevational view, partly in section, showing a further modification of my construction, wherein the upper carpet material is of a loop construction and the lower carpet material is of a cut-loop construction, some of the loops being uncut, and others being cut.

If it is desired that one of the surfaces be a loop cut pile, this simply means that some of the loops will be severed by the member 27 and some will not during the manufacturing process which produces the carpet material 34. This type of construction is illustrated in FIG. 4. In this case, the upper carpet material 34 has none of the vertical loops 23 severed, and is identical to the upper carpet material shown in FIG. 3. However, the lower carpet material 36 is different in construction because during the manufacturing process, by means well known in the art, only some of the vertical loops 23 were severed by a knife edge 27A on the member 27 to produce the severed ends 24A. The other vertical loops 23 were not severed. Whether the construction in FIG. 3 or FIG. 4 is chosen, the adhesive layer 30 is applied in the manner previously described to the back of the lower carpet material, the upper carpet material is then applied to the adhesive, and pressure is applied to this combination.

From the foregoing illustrations, the great versatility of my carpet construction can be seen, as a loop pile, a cut pile, or a cut-loop pile can be used for the upper carpet material 34 or lower carpet material 36, and the color of the upper carpet material may differ from the color of the lower carpet material, if desired. The manufacture of any of these varieties is easily within the scope of the claims of the present invention.

It can be seen that all of the choices just described for the upper carpet material could be used for the lower carpet material as well, if desired. Further, depending upon how one chooses to dye the carpet, the upper material 34 may be a different color from the lower carpet material 36, or vice versa.

Figure 2A:
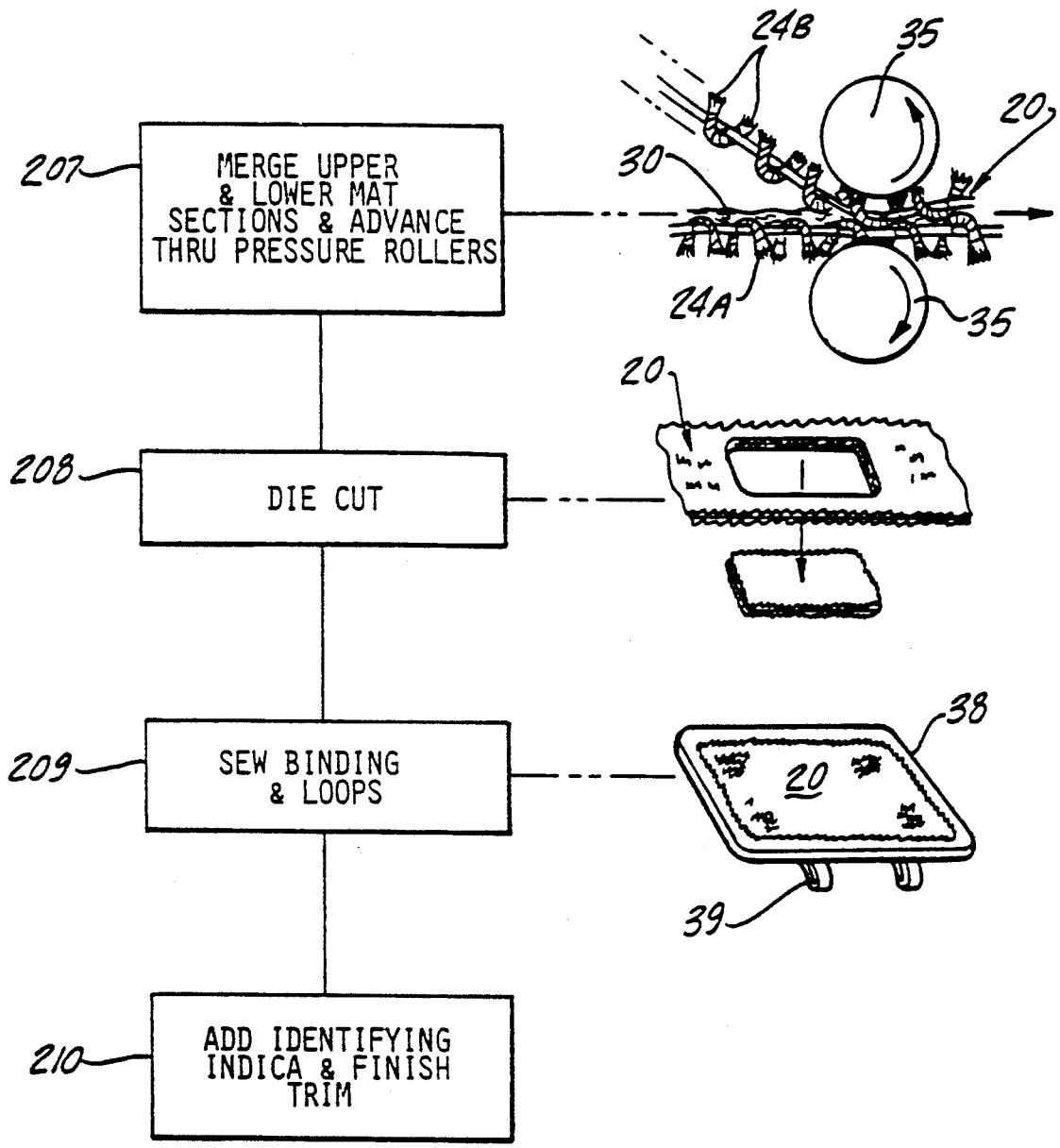
FIG. 2A is a diagrammatic view showing the additional steps used in the manufacture of my improved carpet construction.

Whatever type of construction is used for the upper carpet material 34 and the lower carpet material 36, and whatever color is chosen for each of these carpet materials, as can be seen in FIG. 2A, two layers of the product produced thus far are essentially brought together in a back-to-back 180° opposed relationship between pressure applying means, such as the rollers 35.

At block 207, the upper carpet material 34 is brought into contact with the lower carpet material 36 immediately after the bonding layer 30 is applied. It is then passed through the pressure rollers 35 to not only bind the vertical loops 23 to the scrim 25, but the upper carpet material 34 to the lower carpet material 36.

At this point, the actual manufacture of the material is completed, and the operations from this point on are optional with the user of my invention. It is contemplated that the normal operations which take place after the merging of the upper and lower material will be to die cut the material (block 208) to shape and then sew the normal carpet binding onto the carpet (block 209), and also attach any accessories which may be desired, such as the loops 39, whereby other accessories may be attached to the floor mat so made, such as the retainer disclosed in my U.S. Pat. No. 4,588,628.

After the edge binding 38 and the loops 39 are sewn on, there may be added to the carpet such things as an embossed logo, a finish trim which may be desired by the customer, or a wide variety of other items. These are all illustrated in block 210.

Thus, by partially manufacturing a carpet in a conventional manner, applying bonding material to the vertical loops 23 and scrim 25 of the carpet so manufactured, and then placing a second carpet construction in a 180° opposed relationship onto the top of the bonding material and applying pressure thereto, a unique two-sided carpet construction is provided.

I claim:

1. An improved two-sided carpet construction including in combination:
    (a) A lower carpet material including a lower woven scrim layer and a yarn tufted into said lower woven scrim layer;
    (b) an upper carpet material including an upper woven scrim layer and a yarn tufted into said upper woven scrim layer; and
    (c) a bonding layer extending between said upper carpet material and said lower carpet material and being an intimate contact with said upper woven scrim layer and said lower woven scrim layer to bond said scrim layers tightly together.

2. The construction defined in claim 1, wherein said bonding layer is of a polyethylene material.

3. The construction defined in claim 1, wherein said bonding layer is of a polypropylene material.

4. The construction defined in claim 1, wherein said bonding layer is in contact with said upper woven scrim layer, said lower woven scrim layer and said yarn to bond said upper woven scrim layer, said lower woven scrim layer, and said yarn tightly together.

5. The construction defined in claim 4, wherein said yarn tufted into said lower woven scrim layer is tufted in loops.

6. The construction defined in claim 1, wherein said yarn tufted into said lower woven scrim layer has downwardly extended severed ends.

7. The construction defined in claim 5, wherein said yarn tufted into said upper woven scrim layer is tufted in loops.

8. The construction defined in claim 6, wherein said yarn tufted into said upper woven scrim layer has upwardly extending tufted loops.

9. The construction defined in claim 6, wherein said yarn tufted into said upper woven scrim layer has upwardly extending severed ends.

10. The construction defined in claim 5, wherein said yarn tufted into said upper woven scrim layer has upwardly extending severed ends.

* * * * *